United States Patent
Phibbs, Jr.

(10) Patent No.: US 7,321,869 B1
(45) Date of Patent: Jan. 22, 2008

(54) ALLOCATED BALANCES IN A NET INTEREST REVENUE IMPLEMENTATION FOR FINANCIAL PROCESSING IN A RELATIONAL DATABASE MANAGEMENT SYSTEM

(75) Inventor: Paul H. Phibbs, Jr., Escondido, CA (US)

(73) Assignee: NCR Corp., Dayton, OH (US)

( * ) Notice: Subject to any disclaimer, the term of this patent is extended or adjusted under 35 U.S.C. 154(b) by 1068 days.

(21) Appl. No.: 09/943,059

(22) Filed: Aug. 30, 2001

Related U.S. Application Data (63) Continuation-in-part of application No. 09/610,646, filed on Jun. 29, 2000, and a continuation-in-part of application No. 09/608,355, filed on Jun. 29, 2000.

(60) Provisional application No. 60/253,281, filed on Nov. 27, 2000, provisional application No. 60/253,254, filed on Nov. 27, 2000.

(51) Int. Cl.
*G06Q 40/00* (2006.01)

(52) U.S. Cl. ...................................... 705/30

(58) Field of Classification Search ............... 705/8, 705/30, 35, 38
See application file for complete search history.

(56) References Cited

U.S. PATENT DOCUMENTS 5,189,608 A 2/1993 Lyons et al.

(Continued)

FOREIGN PATENT DOCUMENTS

WO WO 00/62224 10/2000

OTHER PUBLICATIONS

Price et al., "College Accounting", Glencoe Macmillan/McGraw-Hill, Seventh Edition, 1994, pp. 28-41, 529-531, 966-982.*

(Continued)

*Primary Examiner*—Andrew Joseph Rudy
(74) *Attorney, Agent, or Firm*—Gates & Cooper (57) ABSTRACT

A financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| Profit | = | Net Interest Revenue (NIR) |
| | + | Other Revenue (OR) |
| | − | Direct Expense (DE) |
| | − | Indirect Expense (IE) |
| | − | Risk Provision (RP) |

In this calculation, the Net Interest Revenue (NIR) comprises:

| NIR | = | Interest Revenue |
| | − | Cost of Funds |
| | + | Value of Funds |
| | − | Interest Expense |
| | + | Earnings on Allocated Equity (optional) |

The Net Interest Revenue (NIR) is calculated as:

| NIR | = | Interest Revenue |
| | − | Cost of Funds |
| | + | Value of Funds |
| | − | Interest Expense |
| | + | Earnings on Allocated Equity; |

The Cost of Funds includes Allocated Balances that are used to assign balance sheet amounts that are not actual account balances to the accounts for the calculated Net Interest Revenue (NIR).

30 Claims, 3 Drawing Sheets

U.S. PATENT DOCUMENTS

| | | | |
|---|---|---|---|
| 5,249,120 | A | 9/1993 | Foley |
| 5,615,109 | A | 3/1997 | Eder |
| 5,655,085 | A | 8/1997 | Ryan et al. |
| 5,701,400 | A | 12/1997 | Amado |
| 5,712,987 | A | 1/1998 | Waits et al. |
| 5,721,831 | A | 2/1998 | Waits et al. |
| 5,819,237 | A | 10/1998 | Garman |
| 5,911,135 | A | 6/1999 | Atkins |
| 5,991,743 | A | 11/1999 | Irving et al. |
| 6,026,382 | A | 2/2000 | Kalthoff |
| 6,085,175 | A | 7/2000 | Gugel et al. |
| 6,233,566 | B1 | 5/2001 | Levine et al. |
| 6,240,399 | B1 | 5/2001 | Frank et al. |
| 6,253,192 | B1 | 6/2001 | Corlett et al. |
| 6,275,813 | B1 | 8/2001 | Berka |
| 6,292,787 | B1 | 9/2001 | Scott et al. |
| 6,360,210 | B1 | 3/2002 | Wallman |
| 6,393,406 | B1 | 5/2002 | Eder |
| 2002/0026394 | A1 | 2/2002 | Savage et al. |

OTHER PUBLICATIONS

Ainsworth et al., "Introduction to Accounting: An Integrated Approach", Preliminary Edition, 1996, vol. 2, chapter 22.*

John R. Johnson, Raising Relationships, Bank Marketing, Jun. 1999, pp. 30-36, footnote 1.*

John R. Johnson, Raising Relationships, Bank Marketing, Jun. 1999, pp. 16-24.*

Kassing, Jay, "Profitability: Growing the Bottom Line," CSI, 1999, 43 pages.

"Canadian Bank Mines for Data-based Gold," Action Items, Dec. 2, 1997, 2 pages.

"Bank of Ireland Selects Compaq AlphaServers to Help Improve Profitability Management," Dec. 3, 1998, Compaq, 2 pages.

"Marquis Tops 300 MCIF-CRM Data Mart Clients Worldwide," Apr. 18, 2000, 2 pages.

Curley, Bob, "Royal Bank unearths profitability solution", Bank Systems & Technology, Apr. 2000, 2 pages.

* cited by examiner

ALLOCATED BALANCES IN A NET INTEREST REVENUE IMPLEMENTATION FOR FINANCIAL PROCESSING IN A RELATIONAL DATABASE MANAGEMENT SYSTEM

CROSS REFERENCE TO RELATED APPLICATIONS

This application claims priority under 35 U.S.C. § 119(e) to the following co-pending and commonly-assigned patent applications:

Provisional Application Ser. No. 60/253,254, entitled "ALLOCATED BALANCES IN A NET INTEREST REVENUE IMPLEMENTATION FOR FINANCIAL PROCESSING IN A RELATIONAL DATABASE MANAGEMENT SYSTEM," filed on Nov. 27, 2000, by Paul H. Phibbs, Jr.; and Provisional Application Ser. No. 60/253,281, entitled "CAPITAL ALLOCATION IN A NET INTEREST REVENUE IMPLEMENTATION FOR FINANCIAL PROCESSING IN A RELATIONAL DATABASE MANAGEMENT SYSTEM," filed on Nov. 27, 2000, by Paul H. Phibbs, Jr.,;

both of which applications are incorporated by reference herein.

This application is a continuation-in-part that claims priority under 35 U.S.C. §120 to the following co-pending and commonly-assigned patent applications:

Utility application Ser. No. 09/608,355, entitled "ADVANCED AND BREAKTHROUGH NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.,; and Utility application Ser. No. 09/610,646, entitled "BASIC AND INTERMEDIATE NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.,;

both of which applications are incorporated by reference herein.

This application is related to the following co-pending and commonly-assigned patent application:

Utility application Ser. No. 09/608,681, entitled "OTHER REVENUE IMPLEMENTATION FOR FINANCIAL PROCESSING IN A RELATIONAL DATABASE MANAGEMENT SYSTEM," filed on Jun. 29, 2000, by George Robert Hood,;

Utility application Ser. No. 09/608,675, entitled "DIRECT EXPENSE IMPLEMENTATION FOR FINANCIAL PROCESSING IN A RELATIONAL DATABASE MANAGEMENT SYSTEM," filed on Jun. 29, 2000, by George Robert Hood,;

Utility application Ser. No. 09/608,342, entitled "INDIRECT EXPENSE IMPLEMENTATION FOR FINANCIAL PROCESSING IN A RELATIONAL DATABASE MANAGEMENT SYSTEM," filed on Jun. 29, 2000, by George Robert Hood,;

Utility application Ser. No. 09/608,682, entitled "RISK PROVISION IMPLEMENTATION FOR FINANCIAL PROCESSING IN A RELATIONAL DATABASE MANAGEMENT SYSTEM," filed on Jun. 29, 2000, by George Robert Hood,; and Utility application Ser. No. 09/943,060, entitled "CAPITAL ALLOCATION IN A NET INTEREST REVENUE IMPLEMENTATION FOR FINANCIAL PROCESSING IN A RELATIONAL DATABASE MANAGEMENT SYSTEM," filed on Aug. 31, 2001, by Paul H. Phibbs, Jr.,;

all of which are incorporated by reference herein.

BACKGROUND OF THE INVENTION

1. Field of the Invention

This invention relates in general to financial processing systems performed by computers, and in particular, to the use of allocated balances in "net interest revenue" calculations for financial processing using data accessed from a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, and others are still at a more basic level. In addition, there is no agreement as to the rules for profitability calculations, outside of generally accepted accounting policies that external auditors use.

Yet, the majority of financial processing systems attempt to use profitability calculations to differentiate between sources of revenues and expenses. There is a need, then, for a flexible approach to profitability calculations in terms of the overall metric, as well as the type of data used.

SUMMARY OF THE INVENTION

A Value Analyzer is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| Profit | = | Net Interest Revenue (NIR) |
|---|---|---|
| | + | Other Revenue (OR) |
| | − | Direct Expense (DE) |
| | − | Indirect Expense (IE) |
| | − | Risk Provision (RP) |

In this calculation, the Net Interest Revenue (NIR) comprises:

| NIR | = | Interest Revenue |
|---|---|---|
| | − | Cost of Funds |
| | + | Value of Funds |
| | − | Interest Expense |
| | + | Earnings on Allocated Equity (optional) |

The Net Interest Revenue (NIR) is calculated as:

| | | |
|---|---|---|
| NIR | = | Interest Revenue |
| | − | Cost of Funds |
| | + | Value of Funds |
| | − | Interest Expense |
| | + | Earnings on Allocated Equity; |

The cost of Funds includes Allocated Balances that are used to assign balance sheet amounts that are not actual account balances to the accounts for the calculated Net Interest Revenue (NIR).

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The Value Analyzer is a data-driven computer-facilitated financial model that provides accurate and consistent profitability calculations using account, event and organization data stored in a relational database management system (RDBMS), wherein: (1) the account attributes comprise data about accounts being measured, (2) the event attributes comprise data about account-related transactions, and (3) the organization attributes comprise data about the organization's financial status. The profitability calculations performed by the Value Analyzer rely on a Five Factor Atomic Profit Metric (FFAPM):

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |
| | = | NIR + OR − DE − IE − RP |

In the above equation, it is assumed that the sign of elements that reduce profit are negative and those that contribute are positive.

Each of the five factors of FFAPM are defined below:

Net Interest Revenue. This component comprises interest revenue, and is the largest component of profitability (e.g., from loans, deposits, cash, etc.).

Other Revenue. This component comprises non-interest revenue (e.g., fees and commissions), including those driven by events (e.g., open account, excessive counter withdrawals, early payout penalties, etc.).

Direct Expense. This component comprised expenses driven by events that are attributable to accounts.

Indirect Expense. This component comprises expenses that are not attributable to specific accounts. This includes expenses that relate to the cost of doing business that are not driven by account or event activity, such as those that arise from overheads, inefficiencies or differences between standard and actual costs (e.g., the CEO's salary, etc.).

Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and organization data, and enable consistent multiple dimensional aggregation.

The FFAPM is "atomic" in that profitability is computed using data stored in a relational database management system (RDBMS). There are three aspects to this:

components of profitability may be measured below the account level (at events which make up account activity over an accounting period) and accumulated to the account, components of profitability may be measured directly at the account level (such as interest paid or earned for an accounting period), components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are rolled up to the account level from lower level events.

HARDWARE AND SOFTWARE ENVIRONMENT

Figure 1:
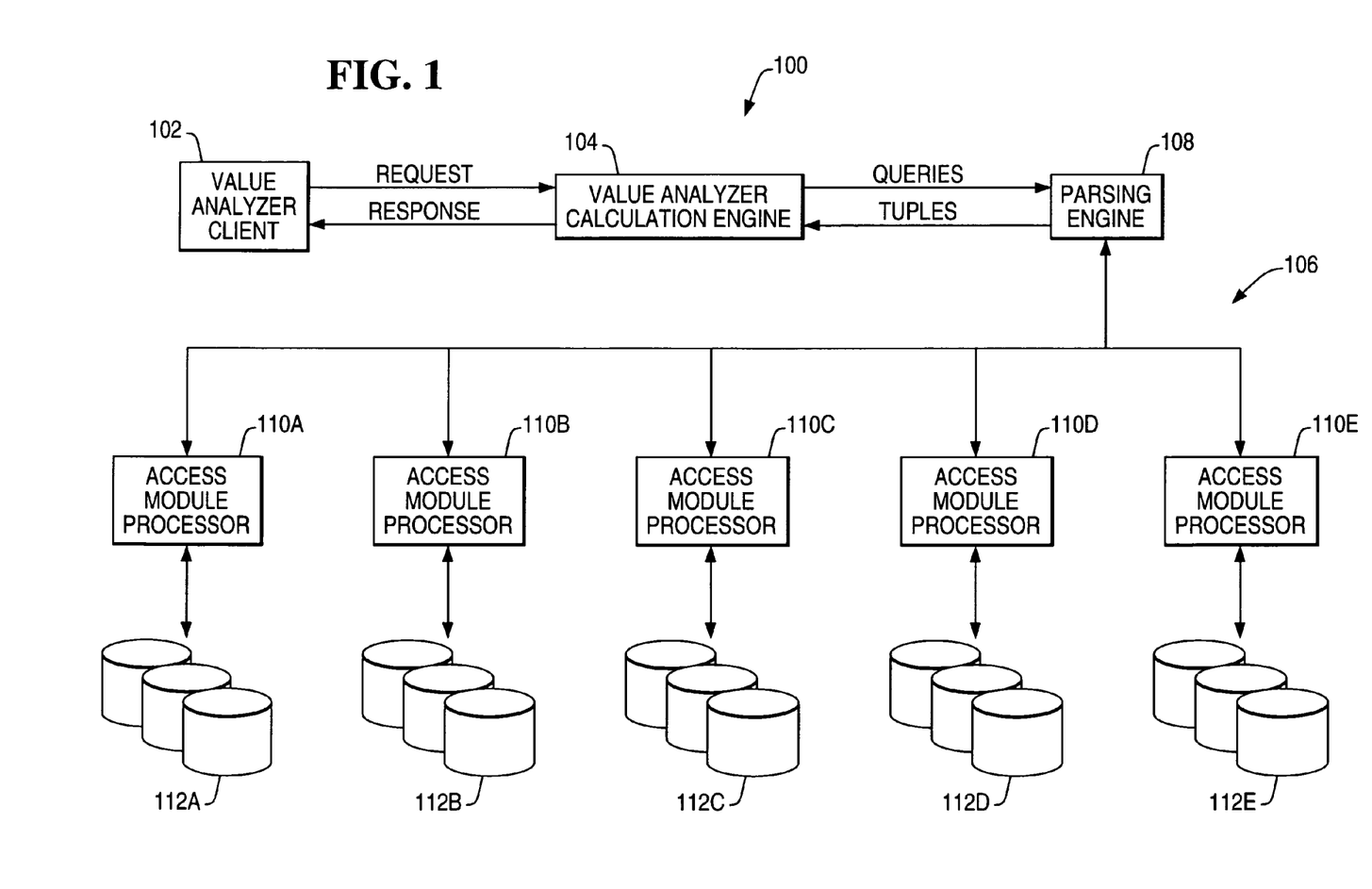
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements a financial processing system in a three-tier client-server architecture, wherein the first or client tier provides a Value Analyzer Client 102 that may include, inter alia, a graphical user interface (GUI), the second or middle tier provides a Value Analyzer Calculation Engine 104 for performing profitability calculations as described later in this application, and the third or server tier comprises a Relational DataBase Management system (RDBMS) 106 that stores the data and metadata necessary for performing the profitability calculations from the data and metadata stored in a relational database. The first, second, and third tiers may be implemented in separate machines, or may be implemented as separate or related processes in a single machine.

In the preferred embodiment, the Value Analyzer Client 102 and the Value Analyzer Calculation Engine 104 together are referred to as the Value Analyzer. Generally, the Value Analyzer Client 102 includes a graphical user interface (GUI) for operators of the system 100, wherein requests are transmitted to the Value Analyzer Calculation Engine 104 and responses are received therefrom. The Value Analyzer Calculation Engine 104 performs the profitability calculations and other processing, including commands or functions for performing various search and retrieval functions in the RDBMS 106, wherein queries are transmitted to the RDBMS 106 as requests and tuples are received therefrom as responses. The Value Analyzer Client 102 and the Value Analyzer Calculation Engine 104 may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMSs could be used.

In the preferred embodiment, the system 100 may use any number of different parallelism mechanisms to take advantage of the parallelism offered by multiple Access Module Processors 110. Further, data within the relational database may be fully partitioned across all data storage devices 112 in the system 100 using hash partitioning or other partitioning methods.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

VALUE ANALYZER DATA FLOW

Figure 2:
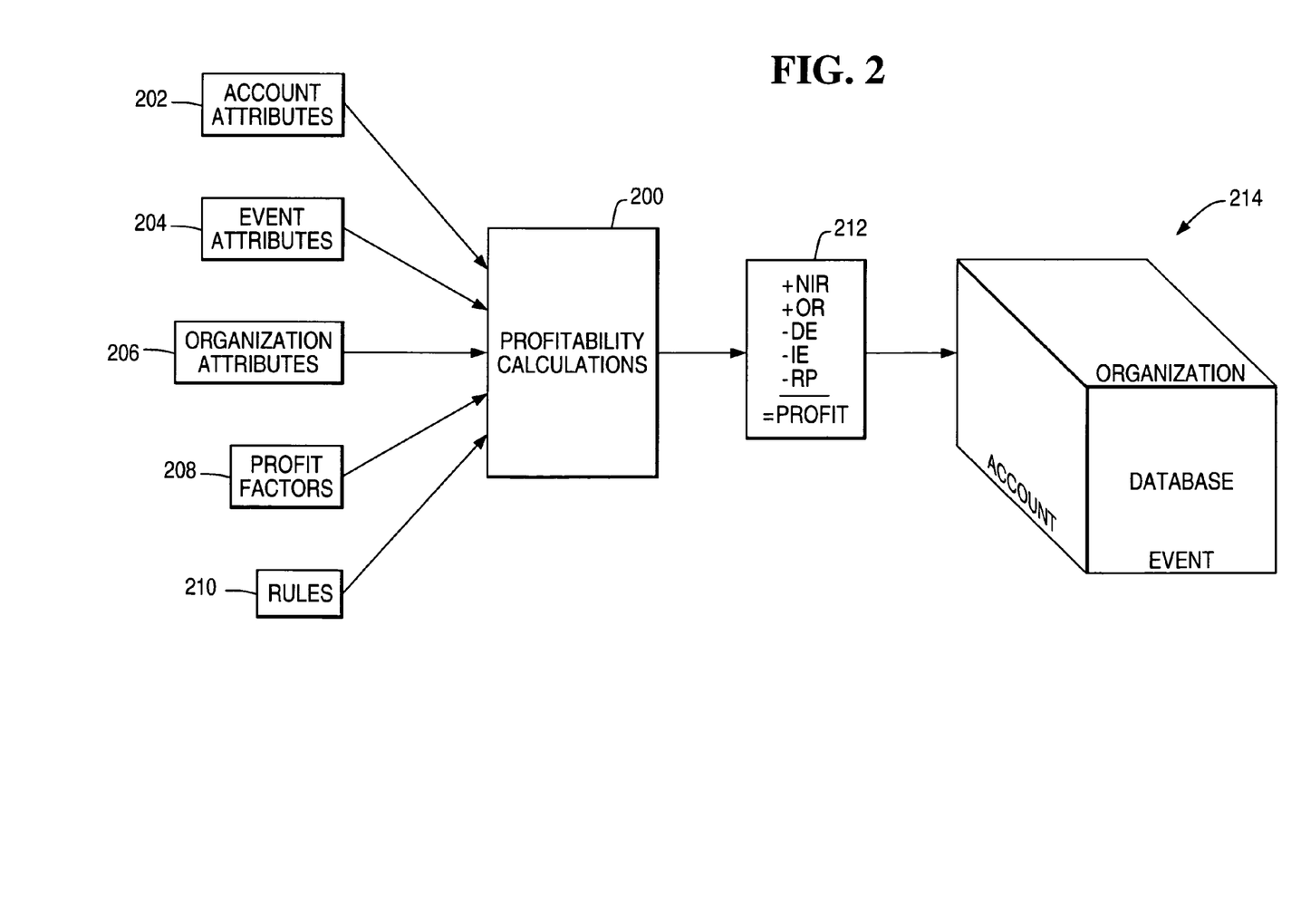
FIG. 2 is a data flow diagram that illustrates the operation of the Value Analyzer according to the preferred embodiment of the present invention.

FIG. 2 is a data flow diagram that illustrates the operation of the Value Analyzer Calculation Engine 104 according to the preferred embodiment of the present invention. Within the Value Analyzer Calculation Engine 104, one or more Profitability Calculations 200 accepts a number of inputs including Account Attributes 202, Event Attributes 204, Organization Attributes 206, and Profit Factors 208. Thereafter, the Profitability Calculations 200 invoke one or more Rules 210 that generate the FFAPM 212, which in turn are used to create the Database 214. The Database 214 may be represented along account, event, or organization dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, loan draw down amount, etc.).

Organization Attributes 206 comprise data about the financial status of the organization. This data includes: balance sheet and profit statement amounts aggregated by the legal or management entities that own the account base being measured.

Profit Factors 208 include parameter values necessary to perform the Profitability Calculations 200. The major classification of this data include:

- Funds transfer rates are pricing methods that require matched maturity opportunity rates for use in valuing each account's marginal use or source of internal funds.
- Unit costs are used for Direct Expense calculations, where a total cost is provided as an Organization Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished).
- Allocated amounts are used in both Other Revenue and Indirect Expense calculations, wherein the allocated amounts are apportioned amongst all accounts in a group.
- Miscellaneous calculation values may comprise, for example, the number of days in a profit measurement period, an equity allocation weighting, etc. These values are known as "modeling" parameters.
- Amortization parameters are used in interest amortization, which requires interest rates and life values used by straight line amortization and by declining balance of amortization.
- Risk measurement parameters are used in Risk Provision calculations, which require various factors, such as: loss rates, reserve percentages, exposure factors, recovery rates, default probabilities and collection costs.
- Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments. Every account with cash flows affecting an organization's balance sheet requires a method of valuing the account's use of internal funds. One approach is "matched maturity Funds Transfer Pricing," which uses a canonical representation of an account's funding characteristics and then determines a value based on adjusted market yields for each instance that requires an interest rate transfer price to calculate an account's marginal Net Interest Revenue.

Equity Allocation. In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment. Other Revenue, Risk Provision and Indirect Expense calculations are applied at the account level using Organization Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocations, which require only information known in the current period and not iterative computation.

Amortization. Some types of income or expense are deferred or accrued over multiple periods, including and subsequent to the current accounting period. This is common to accrual accounting methods used in profit presentations of financial statements, and gives rise to timing differences between cash flows and their related profit as presented in a financial statement in any accounting period. Since the Value Analyzer is designed to reconcile to the financial statement's profit values, it supports deferral and accrual accounting principles. Amortization methods that account for these timing differences are: interest amortization (used for Internet Revenue and expense accruals and for deferral of fees that are in lieu of interest), and straight line or declining balance amortizations (used for cost deferrals and investment depreciation).

Other Revenue Pricing. In situations where account and event activity can be used to derive account level income or fees, the Value Analyzer calculates theses drivers of the profitability in the Other Revenue calculations. These calculations comprise linear combinations of event or account values and modeled coefficients.

Direct Expense. The calculation of account profit adjustments due to account-related activity requires rules that take the form of linear combinations of event or account values and modeled coefficients.

Indirect Expense. In situations where expense apportionment or amortization amounts are aggregated, the user may want different rules applied. These rules allow for multiple profit calculations rules to be applied to derive multiple account level Indirect Expense amounts.

Risk Provision. Adjusting current profit for expected future losses is known as "actuarial" profit provisioning. The Value Analyzer applies actuarial-based methods in its account level profit calculations, where the actuarial reserve that the provisions maintain represents the expected loss associated with all accounts.

Taxable Equivalent Gross-up. Profit is an after-tax measure, and thus some events or portions of some accounts' profits may be excluded from normal taxation. The Value Analyzer adjusts these pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments. Since the Value Analyzer can calculate profits for any number of periods, the adjustment of cash interest payments, and the financial statement's accrual or smoothed representation of interest-related Profit, the Value Analyzer provides a method for converting cash interest amounts to accrual amounts for financial statements. The Value Analyzer implements as "effective interest rate" conversion to accomplish this type of calculation.

Profitability Calculations

The following describes the method used by the Profit Calculations 200:
1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profit Calculations 200 generate one or more values for the five factors of the FFAPM 212, and specifically, the NIR, OR, DE, IE, RP, and Profit values. These values are used to generate the output data 214, which can be stored by the RDBMS 106 in the relational database.

Analytic Variations

The Value Analyzer operates on data and calculation across a continuum, in order to provide the analytic variations necessary for financial processing at various levels of aggregation. This continuum is comprised of multiple tiers as described below:

basic→intermediate→advanced→breakthrough.

Not every tier is necessarily present for each element of data or every calculation.

This continuum embodies the notion of inheritance, wherein the data and calculations of the higher tiers embody the data and calculations of the lower tiers. The principle of inheritance means that the data and calculations by which the separate tiers are defined are nested, i.e., the definition of "intermediate" includes the definition of "basic," but with added functionality that goes beyond "basic," and so on. Thus, there is consistency in the data and calculation performed at the different tiers in the continuum.

Net Interest Revenue

Generally, Net Interest Revenue (NIR) is defined by the following calculation:

| NIR | = | Interest Revenue |
|---|---|---|
|  | − | Cost of Funds |
|  | + | Value of Funds |
|  | − | Interest Expense |
|  | + | Earnings on Allocated Equity (optional) |

These various elements (and sub-elements thereof) are described in more detail below.

Net Interest Revenue is calculated for every account based on the account's use of the balance sheet (funds used or provided). The Net Interest Revenue thus represents the total interest made from all deposit and lending activities (income less expenses).

Net Interest Revenue is designed to enable a common incremental measurement of return across a balance sheet using products, services, customers, and accounts, as each usage is valued against the opportunity of using the same funds in the marketplace, defined as the wholesale market yield curve. This ensures that analysis of returns is consistent and comparable.

Allocated Balances

The Value Analyzer uses Allocated Balances functionality at NIR Intermediate through Breakthrough tiers. The primary use of this functionality is to use the Allocated Balances as a Cost of Funds for the NIR calculation. Specifically, the Cost of Funds include Allocated Balances that are used to assign balance sheet amounts that are not actual account balances and the Allocated Balances are selected from a group comprising Float, Fixed Assets, Payables and Receivables balances.

For example, this allows a bank to assign "Float" balances to those accounts that generate float, so that the account's NIR can then be penalized for the Cost of Funds related to the float. Another less common use will arise if the bank wants to apply the Cost of Funds related to supporting non-customer balances (fixed assests, cash) to the customer accounts to give a "fully absorbed" view of the balance sheet.

Accounts that are to receive allocated balances are selected based upon values of account attributes. Each of these accounts is then eligible for four different apportionment methods, namely:

1) Account Counts
2) Account Balance Amount
3) Event Count
4) Event Balance Amount Account Counts provide allocated balance amounts based on the percentage of total accounts each account represents. The numerator would be 1 as each account would represent itself, and would be divided by the total number of accounts used for this apportionment. If 10 accounts were used, then each account would be assigned a 10% (1/10) apportionment of the apportionment amount defined by the user.

Account Balances provide allocated balance amounts based on the percentage of total account balance each account represents. The numerator would be each account's account balance sum as an absolute value, and would be divided by the total sum of account balances for the accounts used for this apportionment. If 2 accounts were used, with account balances of $40.00 and $60.00 respectively, then one account would be assigned a 40% ($40/$100) apportionment of the apportionment amount defined by the user, while the other would be assigned 60% ($60/$100).

Event Counts provide allocated balance amounts based on the percentage of total events each account represents. The numerator would be the sum of the events for that account (based on an identified "event trio": Channel_Type, Event_Activity_Type, and Party_Channel_Role_Code), and would be divided by the total sum of events for accounts defined for this apportionment. If 2 accounts were used, with event counts of 20 and 80, respectively, then one account would be assigned a 20% (20/100) apportionment of the total apportionment amount defined by the user, while the other would be assigned an 80% (80/100) apportionment.

Event Balance Amounts provide allocated balance amounts based on the percentage of total event balances each account represents. The numerator would be the sum of the event balances for that account (based on an identified "event trio": Channel_Type, Event_Activity_Type, and Party_Channel_Role_Code), and would be divided by the total sum of event balances for accounts defined for this apportionment. If 2 accounts were used, with event balance sums of $30.00 and $70.00 respectively, then one account would be assigned a 30% ($30/$100) apportionment of the apportionment amount defined by the user, while the other would be assigned a 70% ($70/$100) apportionment.

The following describes the general definition and requirements of Allocated Balances. Allocated Balances using various apportionment methods are available in the NIR Intermediate through Breakthrough tiers.

Intermediate Tier—NIR

Intermediate tier calculations are distinguished mainly by allowing for multiple balances on a single account, as well as the determination of treatment rate based on product type and balance type.

| Inputs | Outputs |
| --- | --- |
| Float and Allocation Amounts For Allocation Amounts: | Interest Income Interest Expense |
| Total Allocation Amount Allocation Rule | Cost of Funds Value of Funds |

Float and Allocation Amounts are listed as inputs in order to emphasize the fact that these balances are included in this analysis. This is accommodated in the equations, however, by allowing balance "type" to include account float, allocated float, or other allocated balances to the account. The Allocation Amount includes Allocated Float; however, note that the Intermediate tier includes Account-based Float only, and not Allocated Float.

The Intermediate tier provides for allocated balances that the Financial Institution may identify. This requires that the Financial Institution provide to the Value Analyzer these various amounts which are to be allocated to groups of accounts according to an Allocation Rule, as well as the treatments which are to be applied. It is assumed that all allocated balances are non-interest-bearing amounts, e.g., asset balances, including any allocated float. Allocated balances, for example, may include premises considerations, in order to burden the Cost of Funds for certain accounts associated with a particular location.

Note that there is also a distinction between account float and float which may be allocated. Financial institutions may have identified float at an accumulated level rather than at the account level, and may wish to allocate this float back to accounts according to some rule. This desire is accommodated at the Intermediate tier through the use of allocated balances.

Allocation rules are not elaborated herein, but it is assumed that the Institution has pooled amounts for allocation and has identified rules for this allocation to specific accounts. A similar technique is elaborated later with the discussion of Other Revenue.

For the purposes of this discussion, Balance Type is the combined effect of two balance characteristics which are named as follows:

"Balance class" is defined as being either asset or liability. At the end of each banking day, an account is in one class or the other; some accounts are always of one class, while others (such as Current Accounts in the UK) vary in class over time.

"Balance tier" is defined to be the tiers used by the Financial Institution in supplying balances to the Value Analyzer.

In all cases, calculations use average balances, which are assumed to be supplied to the Value Analyzer from the RDBMS 106.

For those Financial Institutions that cannot provide account level interest income or expense accruals by balance tier, it is necessary for the Value Analyzer to calculate interest income and expense (balance*interest rate) using effective interest rates adjusted for compounding and interest payment frequency, day basis, etc.

Each balance type (based on class and tier) must have a transfer pricing treatment identified for it. The treatment is a function of product type of the account, given the balance. For the Intermediate tier, there is only one treatment per product type (given the balance type, and tier). Consequently, there is no matched maturity treatment at this level, and only pooled or spot rates are used. The Value Analyzer will be able to calculate treatment rates from treatment parameters which are supplied by the Financial Institution.

| | |
|---|---|
| $AB_{(c,t)}(a) =$ | Average Balances of the account a (=0 if null), wherein c is the balance class (asset or liability) and t is the balance tier. |
| eff rate$_{(c,t)}(a) =$ | Effective interest rate for the account a. |
| $pt(a) =$ | Product type for account a, which is used to identify the treatment rate. |
| $R_{(c,t)}(pt(a)) =$ | Treatment rate for account a of this product type, given the balance class and tier. |
| Int Inc(a) = | Interest Income of account a. |
| COF (a) = | Cost of Funds for account a. |
| Int Exp (a) = | Interest Expense for account a. |
| VOF (a) = | Value of Funds for account a. |

Then, where summations are over the possible balance variables for the account:

| | |
|---|---|
| Int Inc(a) = | $\Sigma\ AB_{(asset,t)}(a) * $ eff rate$_{(asset,t)}(a)$ (if calculation required). |
| COF(a) = | $\Sigma\ AB_{(asset,t)}(a) * R_{(asset,t)}(pt(a))$. |
| Int Exp(a) = | $\Sigma\ AB_{(liability,t)}(a) * $ eff rate$_{(liability,t)}(a)$ (if calculation required). |
| VOF(a) = | $\Sigma\ AB_{(liability,t)}(a) * $ eff rate$_{(liability,t)}(pt(a))$. |

Calculate the Allocated Balances
Let:

| | |
|---|---|
| Total Amount = | Specific amount to be allocated to account a. |
| Rule = | Rule for allocating Amount. |

Then, the Value Analyzer calculates the allocation to account a to determine the allocated balance:

| | |
|---|---|
| B(a) = | Rule applied to (Total Amount). |
| = | The Allocated Balance. |

This balance is treated as any one of the average balances associated with the account, where class is specified by users, and tier is "allocated". Thus, $B_t(a)$ is one of the $AB_{(c,t)}(a)$ as defined below.

As noted above, the Value Analyzer will provide, at the account level, Interest Income, Interest Expense, Cost of Funds, and Value of Funds. The average balance for the account is assumed to be available from the RDBMS 106.

In many cases, accounts will have either asset balances or liability balances but not both; but, in other cases, accounts can have both balances during the desired period. This characteristic is determined from the Product Group for the account.

The Financial Institution determines whether and where ledger or cleared balances are used, and how float will be handled for various types of products. The appropriate average balances, interest income amounts, and interest expense amounts are assumed to be supplied to the Value Analyzer form the RDBMS 106.

The effective interest rate for the account is the account rate adjusted for compound payment frequency, day basis, etc. The account's Effective Interest Rate (EIR) may be computed to the chosen period, but this is to be determined by the Financial Institution. The key requirement is that all factors must be calculated to the same period, if they are needed for the calculation.

The Financial Institution will have the ability to override the assigned treatment rate for any account and enter a value manually. Typically, the date for the pool rate (the treatment rate) is the current period.

Advanced Tier—NIR

In the Advanced tier, the transfer price for every account is based on account characteristics such as open date, balance and maturity data (e.g., matched maturity funding). This also allows for specification of a product-level prepayment rate at the account group level. It is defined at a rate treatment type level (where a rate treatment type specifies 30 year mortgage loans with a specific amortization type, originated on 1 January), applied at the account level.

The Advanced Tier allows users to separate the loan spread, deposit spread and the asset/liability spread and assign those spreads to the accounts and units that generate them, i.e., the loan and deposit spreads appear on their respective accounts and the mismatch spread is removed from the account level NIR.

The Transfer Rate calculates treatment rates based on curve fitting techniques (e.g., constant spread), and account characteristics (open date, term, amortization type). Treatment rates will be calculated and mapped to accounts using treatment type which is determined using account characteristics. Earnings on Allocated Equity (EOAE) may be apportioned by one of the four rules discussed above. Locked transfer rates are based on matched maturity funding.

Advanced Tier Inputs and Outputs - NIR Without EOAE Considerations

| Inputs | Outputs |
|---|---|
| For the Account: | Interest Income |
| Average Balanced$_{class,tier}$ | Interest Expense |
| Interest Income and Interest Expense | Cost of Funds |
| Product, Type, Features | Value of Funds |
| Float and Allocation Amounts | |
| Treatment Rates: | |
| Rate(product type, balance, features) | |
| For Allocation Amounts: | |
| Total Allocation | |
| Allocation Rule | |
| If required to compute Interest Income and Interest Expense, for the Account: | |
| Effective Interest Rate$_{class,state,tier}$ | |

With regard to the inputs, Treatment Rates includes rates for all balances (and tiers), including float or allocated balances, as may occur. A general principle is required, however, that allows the user to provide an override value for treatment rate at the account level.

Further, interest income and interest expense may be taken from the RDBMS 106, and so are just passed through the Value Analyzer. These values are needed for various operations, audit controls, restatements, and the like, however, and so there may be requirements for persistence and system access. If these values must be calculated, as noted in the text at various points, then they are computed as "new" outputs.

Advanced Tier Process—NIR Without EOAE Considerations

As in the Intermediate tier, the balance type is defined as a composite of "balance class," and "balance tier." Each balance (based on class and tier) must have a transfer pricing treatment identified for it. The Value Analyzer will be able to calculate treatment rates from treatment parameters which are supplied by the Financial Institution.

Also, as in the Intermediate tier, the appropriate average balances, interest income amounts, and interest expense amounts are assumed to be supplied to the Value Analyzer from the RDBMS 106.

Advanced tier calculations allow for account features to identify the transfer rate use, so that matched maturity funding and pre-payment rates are accommodated. Such features as Open Date, Reset Date, Term, Payment Characteristics, Rate Type, etc., may be taken into account. This allows for locked transfer rates.

Calculate the FFAPM Factors for the Account

Let:

| | |
|---|---|
| $AB_{(c,t)}(a) =$ | Average Balances of the account a (=0 if null), wherein c is the balance class (asset or liability) and t is the balance tier. |
| eff rate$_{(c,t)}(a) =$ | Effective interest rate for the corresponding balance. |
| type$_{p,a}(a) =$ | Accounts a's product (p) and account (a) type as needed to identify treatment. |
| $R_{(c,t)}(type_{p,a}(a)) =$ | Treatment rate for accounts of this type, given the balance class and tier. |
| Int Inc(a) = | Interest Income of account a. |
| COF (a) = | Cost of Funds for account a. |
| Int Exp (a) = | Interest Expense for account a. |
| VOF (a) = | Value of Funds for account a. |

Then, where summations are over the possible balance variables for the account:

| | |
|---|---|
| Int Inc(a) = | $\Sigma\ AB_{(asset,t)}(a) * eff\ rate_{(asset,t)}(a)$ (if calculation required). |
| COF(a) = | $\Sigma\ AB_{(asset,t)}(a) * R_{(asset,t)}(type_{p,a}(a))$. |
| Int Exp(a) = | $\Sigma\ AB_{(liability,t)}(a) * eff\ rate_{(liability,t)}(a)$ (if calculation required). |
| VOF(a) = | $\Sigma\ AB_{(liability,t)}(a) * R_{(liability,t)}(type_{p,a}(a))$. |

In the above cases, the calculations use average balances, which are assumed to be supplied to the Value Analyzer from the RDBMS 106. In many cases, accounts will have either asset balances or liability balances but not both; however, in other cases, accounts can have both balances during the desired period. This characteristic is determined from the Product Group for the account. The Financial Institution determines whether and where ledger or cleared balances are used, and how float will be handled for various types of products.

The appropriate interest income amounts and interest expense amounts are assumed to be supplied to the Value Analyzer by the RDBMS 106, but will be calculated, if required, by the Value Analyzer using the average balance, and the customer rate. The Effective Interest Rate (EIR) for the account is the account rate adjusted for compound payment frequency, day basis, etc. The account's EIR may be computed to the chosen period, but this is to be determined by the Financial Institution. The key requirement is that all factors must be calculated to the same period, if they are needed for the calculation.

The Financial Institution will have the ability to override the assigned treatment rate for any account and enter a value manually. Note that, typically, the date for a pool rate is the current period.

Breakthrough Tier—NIR

In the Breakthrough tier, the transfer price for every account is based on matched maturity funding and predicted account behavior (e.g., prepayments). This is defined at a rate treatment type level (where a rate treatment type now includes behavioral characteristics: 30 year mortgage loans with a specific amortization type, with a specific prepayment speed, originated on 1 January), and applied at the account level.

| Breakthrough Tier Inputs and Outputs - NIR Without EOAE Considerations | |
|---|---|
| Inputs | Outputs |
| For the Account: | Interest Income |
| Average Balance$_{class,tier}$ | Interest Expense |
| Interest Income and Interest Expense | Cost of Funds |
| Product, Account, and Behavior Features | Value of Funds |
| Float and Allocation Amounts | |
| Treatment Rates: | |
| Rate(product type/group, balance, type features) | |
| For Allocation Amounts: | |
| Total Allocation | |
| Allocation Rule | |
| Algorithms for Treatment Rates | |
| If required to compute Interest Income and Interest Expense, for the Account: | |
| Effective Interest Rate$_{class,tier}$ | |

Float and Allocation Amounts are inputs in order to emphasize the fact that these balances are included in this analysis. This is accommodated in the equations, however, by allowing balance "type" to include account float, allocated float, or other allocated balances to the account.

Treatment rates include rates for all balances and tiers; including float or allocated balances, as may occur. A general principle is required, however, that allows the user to provide an override value for treatment rate at the account level.

Allocation amounts include Allocated Float. Note that Intermediate Level includes Account-based Float only, and no Allocated Float.

Interest income and interest expense may be taken from the RDBMS 106, and so are just passed through the Value Analyzer. These values are needed for various operations, audit controls, restatements, and the like, however, and so there may be requirements for persistence and system access. If these values must be calculated, as noted in the text at various points, then they are computed as "new" outputs.

Breakthrough Tier Process—NIR without EOAE Considerations

As in the Advanced tier, the balance type is defined as a composite of "balance state," and "balance tier." Each balance (based on class and tier) must have a transfer pricing treatment identified for it. The Value Analyzer will be able to calculate treatment rates from treatment parameters that are supplied by the Financial Institution.

Breakthrough tier calculations allow the Financial Institution to identify behavioral features, as well as product and account features in the Advanced tier, to identify the transfer rate. The Breakthrough tier, through the principle of "inheritance," also allows for all the functionality described with the Advanced tier (balance tiers, allocated balances, etc.).

As with other tiers of the continuum, the appropriate average balances, interest income amounts, and interest expense amounts are assumed to be supplied to the Value Analyzer from the RDBMS 106.

As above, let $AB_{(c,t)}(a)$ include allocated balances. Let:

| | |
|---|---|
| $AB_{(c,t)}(a) =$ | Average Balances of the account a (=0 if null), wherein c is the balance class (asset or liability) and t is the balance tier. |
| eff rate$_{(c,t)}(a) =$ | Effective interest rate for the corresponding balance. |
| type$_{p,a,b}(a) =$ | Accounts a's product (p), account (a), and behavior (b) type as needed to identify treatment. |
| $R_{(c,t)}($type$_{p,a,b}(a)) =$ | Rate (treatment rate) for accounts of this type, given the balance class and tier. |
| Int Inc(a) = | Interest Income of account a. |
| COF (a) = | Cost of Funds for account a. |
| Int Exp (a) = | Interest Expense for account a. |
| VOF (a) = | Value of Funds for account a. |

Then, where summations are over the possible balance variables for the account:

| | |
|---|---|
| Int Inc(a) = | $\Sigma\ AB_{(asset,t)}(a) *$ eff rate$_{(asset,t)}(a)$ (if calculation required). |
| COF(a) = | $\Sigma\ AB_{(asset,t)}(a) * R_{(asset,t)}($type$_{p,a,b}(a))$. |
| Int Exp(a) = | $\Sigma\ AB_{(liability,t)}(a) *$ eff rate$_{(liability,t)}(a)$ (if calculation required). |
| VOF(a) = | $\Sigma\ AB_{(liability,t)}(a) * R_{(liability,t)}($type$_{p,a,b}(a))$. |

In the above cases, the calculations use average balances, which are assumed to be supplied to the Value Analyzer from the RDBMS 106. In many cases, accounts will have either asset balances or liability balances but not both, but in other cases accounts can have both balances during the desired period. This characteristic is determined from the Product Group for the account. The Financial Institution determines whether and where ledger or cleared balances are used, and how float will be handled for various types of products.

The appropriate interest income amounts and interest expense amounts are assumed to be supplied to the Value Analyzer by the RDBMS 106, but will be calculated, if required, using the average balance, and the customer rate. The Effective Interest Rate (EIR) for the account is the account rate adjusted for compound payment frequency, day basis, etc. The EIR may be computed to the chosen period, but this is to be determined by the Financial Institution. The key requirement is that all factors must be calculated to the same period, if they are needed for the calculation.

The Financial Institution will have the ability to override the assigned treatment rate for any account and enter a value manually. Typically, the date for a pool rate is the current period.

LOGIC OF THE PREFERRED EMBODIMENT

Figure 3:
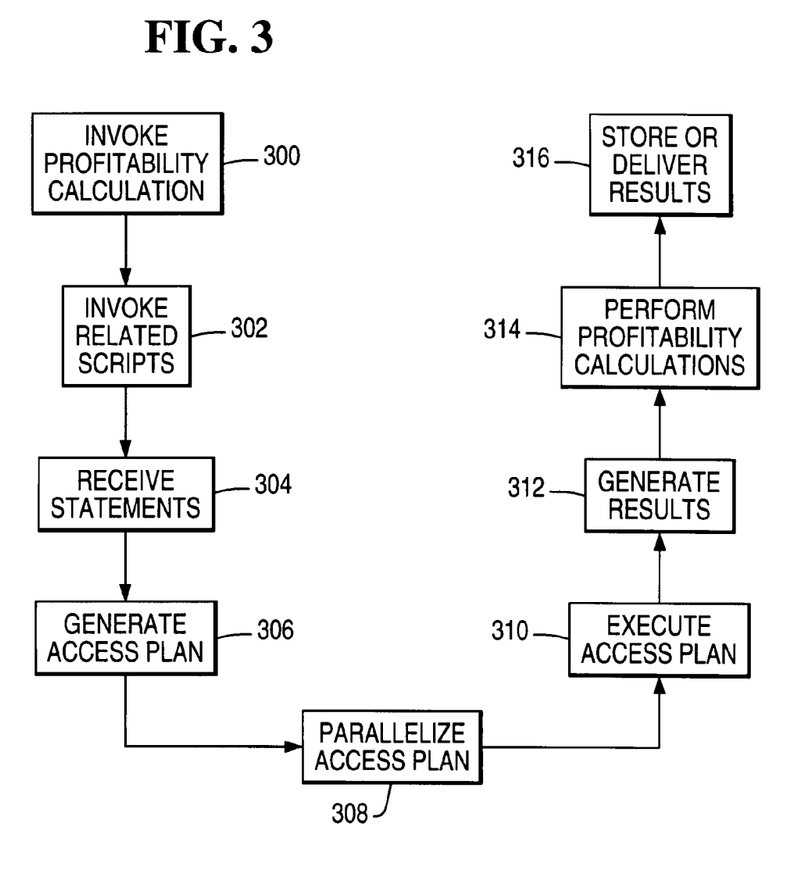
FIG. 3 is a flow chart illustrating the steps necessary for the execution of Profitability Calculations according to the preferred embodiment of the present invention.

FIG. 3 is a flow chart illustrating the steps necessary for the execution of Profitability Calculations 200 according to the preferred embodiment of the present invention. Those skilled in the art will recognize that this logic is provided for illustrative purposes only and that different logic may be used to accomplish the same results.

Block 300 represents the Value Analyzer Client 102 invoking one or more Profitability Calculations 200 in the Value Analyzer Calculation Engine 104.

Block 302 represents the Value Analyzer Calculation Engine 104 invoking one or more scripts related to the invoked Profitability Calculations 200, wherein the scripts comprise SQL statements that are transmitted to the RDBMS 106. These SQL statements access account, event and organization attributes from the database managed by the RDBMS 106.

Block 304 represents the Parsing Engine 108 of the RDBMS 106 receiving the SQL statements and transforming the statements into an operator tree.

Block 306 represents the Parsing Engine 108 of the RDBMS 106 generating one or more access plans from the operator tree.

Block 308 represents the Parsing Engine 108 of the RDBMS 106 parallelizing the access plans, and then transmitting the access plans to their assigned Access Module Processors 110A-E of the RDBMS 106.

Block 310 represents the Access Module Processors 110A-E of the RDBMS 106 performing the required data manipulation associated with the access plans received from the Parsing Engine 108, wherein the access plans are performed in parallel by the Access Module Processors 110A-E.

Block 312 represents the Parsing Engine 108 of the RDBMS 106 merging the results received from the Access Module Processors 110A-E and providing the merged results to the Value Analyzer Calculation Engine 104 as account, event and organization attributes.

Block 314 represents the Value Analyzer Calculation Engine 104 performing the invoked Profitability Calculations 200 using the account, event and organization attributes accessed from the RDBMS 106, as well as one or more profit factors and one or more rules. In this Block, the Profitability Calculations 200 comprise:

| | | |
|---|---|---|
| Profit $(a_i)$ | = | Net Interest Revenue (NIR) $(a_i)$ |
| | + | Other Revenue (OR) $(a_i)$ |
| | − | Direct Expense (DE) $(a_i)$ |
| | − | Indirect Expense (IE) $(a_i)$ |
| | − | Risk Provision (RP) $(a_i)$ | for an account $a_i$. This is described in more detail in FIG. 4 below.

Block 316 represents the Value Analyzer Calculation Engine 104 delivering the output or results from the invoked Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Calculation Engine 104, or other computer programs, as desired.

Figure 4:
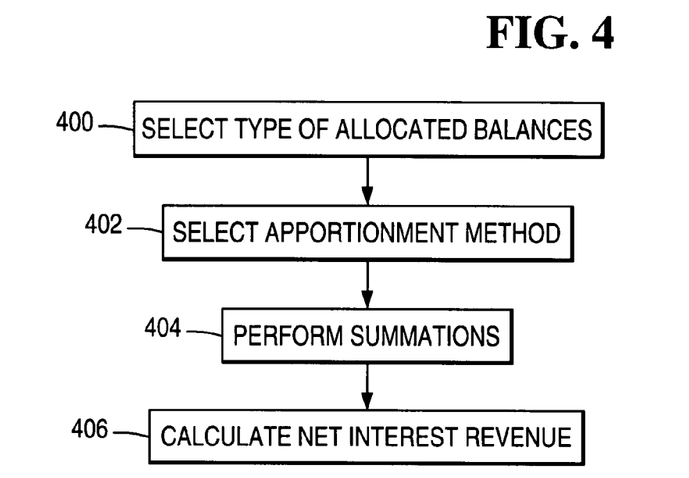
FIG. 4 is a flow chart further illustrating the steps necessary for the execution of Profitability Calculations 200 according to the preferred embodiment of the present invention.

FIG. 4 is a flow chart further illustrating the steps necessary for the execution of Profitability Calculations 200 according to the preferred embodiment of the present invention. Specifically, FIG. 4 describes the steps of Block 314 in more detail. Those skilled in the art will recognize that this logic is provided for illustrative purposes only and that different logic may be used to accomplish the same results.

Block 400 represents the Value Analyzer Calculation Engine 104 selecting a type of Allocated Balances and the accounts that receive the Allocated Balances. More specifically, the Allocated Balances are generally selected from a group comprising Float; Fixed Assets, Payables and Receivables balances, and the accounts that receive the Allocated Balances are generally selected based upon the account attributes.

Block 402 represents the Value Analyzer Calculation Engine 104 selecting an apportionment method. More specifically, the invoked Profitability Calculations 200 apportion the Allocated Balances among the accounts using a method selected from a group comprising: (1) an Account Counts method that provides allocated balance amounts based on a percentage of total accounts each account represents; (2) an Account Balance Amount method that provides allocated balance amounts based on a percentage of total account balance each account represents; (3) an Event Count method that provides allocated balance amounts based on a percentage of total events each account represents; and (4) an Event Balance Amount method that provides allocated balance amounts based on a percentage of total event balances each account represents.

Block 404 represents the Value Analyzer Calculation Engine 104 performing summations over the possible balance variables for the account according to the following:

| | |
|---|---|
| Int Inc(a) = | $\Sigma\ AB_{(asset,t)}(a)\ *\ eff\ rate_{(asset,t)}(a)$ |
| COF(a) = | $\Sigma\ AB_{(asset,t)}(a)\ *\ R_{(asset,t)}(pt(a))$. |
| Int Exp(a) = | $\Sigma\ AB_{(liability,t)}(a)\ *\ eff\ rate_{(liability,t)}(a)$, and |
| VOF(a) = | $\Sigma\ AB_{(liability,t)}(a)\ *\ R_{(liability,t)}(pt(a))$. |

| | |
|---|---|
| $AB_{(c,t)}(a)$ = | Average Balances of the account a, wherein c is the balance class and t is the balance tier. |
| $eff\ rate_{(c,t)}(a)$ = | Effective interest rate for the account a. |
| pt(a) = | Product type for account a, |
| $R_{(c,t)}(pt(a))$ = | Treatment rate for account of the product type given the balance class and tier. |
| Int Inc(a) = | Interest Income of account a. |
| COF (a) = | Cost of Funds for account a. |
| Int Exp (a) = | Interest Expense for account a. |
| VOF (a) = | Value of Funds for account a. |

In Block 404, the Value Analyzer Calculation Engine 104 perform these calculations at an Intermediate tier, and Advanced tier, and a Breakthrough tier. These calculations are described in more detail below.

The Intermediate tier calculation of the Allocated Balances allows for multiple balances on a single account, as well as the determination of treatment rate based on product type and balance type.

The Advanced tier calculation of the Allocated Balances allow for specification of a product-level prepayment rate for the accounts. The Advanced tier calculation of the Allocated Balances allow also loan spread, deposit spread and asset/liability spread to be separated and assigned to the accounts that generate the spreads.

The Breakthrough tier calculation of the Allocated Balances uses a transfer price for every account based on matched maturity funding and predicted account behavior. In addition, the Breakthrough tier calculation of the Allocated Balances allows behavioral features, product and account features to be used to identify a transfer rate.

Block 406 represents the Value Analyzer Calculation Engine 104 performing calculations of the Net Interest Revenue (NIR) as follows:

| | | |
|---|---|---|
| NIR | = | Interest Revenue |
| | − | Cost of Funds |
| | + | Value of Funds |
| | − | Interest Expense |
| | + | Earnings on Allocated Equity; |

In these calculations, the Cost of Funds includes Allocated Balances that are used to assign balance sheet amounts that are not actual account balances to the accounts for the calculated Net Interest Revenue (NIR).

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer, which is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |

In this calculation, the Net Interest Revenue (NIR) comprises:

| NIR | = | Interest Revenue |
|---|---|---|
| | − | Cost of Funds |
| | + | Value of Funds |
| | − | Interest Expense |
| | + | Earnings on Allocated Equity (optional) |

The Net Interest Revenue (NIR) is calculated as:

| NIR | = | Interest Revenue |
|---|---|---|
| | − | Cost of Funds |
| | + | Value of Funds |
| | − | Interest Expense |
| | + | Earnings on Allocated Equity; |

The Cost of Funds includes Allocated Balances that are used to assign balance sheet amounts that are not actual account balances to the accounts for the calculated Net Interest Revenue (NIR).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing financial processing in a computer, comprising:

(a) accessing account, event and organization attributes from a database accessible by the computer, wherein (1) the account attributes comprise data about accounts being measured, (2) the event attributes comprise data about account-related transactions, and (3) the organization attributes comprise data about the organization's financial status;

(b) performing one or more profitability calculations in the computer using the account, event and organization attributes accessed from the database, as well as one or more profit factors and one or more rules, wherein the profitability calculations include:

| Profit | = | Net Interest Revenue (NIR) |
|---|---|---|
| | + | Other Revenue (OR) |
| | − | Direct Expense (DE) |
| | − | Indirect Expense (IE) |
| | − | Risk Provision (RP) |

(c) wherein the Net Interest Revenue (NIR) is calculated as:

| NIR | = | Interest Revenue |
|---|---|---|
| | − | Cost of Funds |
| | + | Value of Funds |
| | − | Interest Expense |
| | + | Earnings on Allocated Equity; |

(d) wherein the Cost of Funds includes Allocated Balances that are used to assign balance sheet amounts that are not actual balances to the accounts for the calculated Net Interest Revenue (NIR).

2. The method of claim 1, wherein the Allocated Balances are selected from a group comprising Float, Fixed Assets, Payables and Receivables balances.

3. The method of claim 1, wherein the accounts that receive the Allocated Balances are selected based upon the account attributes.

4. The method of claim 1, wherein the Allocated Balances are apportioned among the accounts using a method selected from a group comprising:

(1) an Account Counts method that provides allocated balance amounts based on a percentage of total accounts each account represents;

(2) an Account Balance Amount method that provides allocated balance amounts based on a percentage of total account balance each account represents;

(3) an Event Count method that provides allocated balance amounts based on a percentage of total events each account represents; and (4) an Event Balance Amount method that provides allocated balance amounts based on a percentage of total event balances each account represents.

5. The method of claim 1, further comprising performing summations over the possible balance variables for the account according to the following:

| Int Inc(a) = | $\Sigma\, AB_{(asset,t)}(a) * \text{eff rate}_{(asset,t)}(a)$, |
|---|---|
| COF(a) = | $\Sigma\, AB_{(asset,t)}(a) * R_{(asset,t)}(pt(a))$, |
| Int Exp(a) = | $\Sigma\, AB_{(liability,t)}(a) * \text{eff rate}_{(liability,t)}(a)$, and |
| VOF(a) = | $\Sigma\, AB_{(liability,t)}(a) * R_{(liability,t)}(pt(a))$, | wherein:

| $AB_{(c,t)}(a) =$ | Average Balances of account a, wherein c is a balance class and t is a balance tier, |
|---|---|
| $\text{eff rate}_{(c,t)}(a) =$ | Effective interest rate for the account a, |
| $pt(a) =$ | Product type for account a, |
| $R_{(c,t)}(pt(a)) =$ | Treatment rate for accounts of the product type given the balance class and tier, |
| Int Inc(a) = | Interest Income of account a, |
| COF (a) = | Cost of Funds for account a, |
| Int Exp (a) = | Interest Expense for account a, and |
| VOF (a) = | Value of Funds fot account a. |

6. The method of claim 1, wherein an Intermediate tier calculation of the Allocated Balances allows for multiple balances on a single account, as well as the determination of treatment rate based on product type and balance type.

7. The method of claim 1, wherein an Advanced tier calculation of the Allocated Balances allows for specification of a product-level prepayment rate for the accounts.

8. The method of claim 1, wherein an Advanced tier calculation of the Allocated Balances allows loan spread, deposit spread and asset/liability spread to be separated and assigned to the accounts that generate the spreads.

9. The method of claim 1, wherein a Breakthrough tier calculation of the Allocated Balances uses a transfer price for every account based on matched maturity funding and predicted account behavior.

10. The method of claim 1, wherein a Breakthrough tier calculation of the Allocated Balances allows behavioral features, product and account features to be used to identify a transfer rate.

11. A system for financial processing, comprising:
   a computer;
   logic, performed by the computer, for:
   (a) accessing account, event and organization attributes from a database accessible by the computer, wherein (1) the account attributes comprise data about accounts being measured, (2) the event attributes comprise data about account-related transactions, and (3) the organization attributes comprise data about the organization's financial status;
   (b) performing one or more profitability calculations in the computer using the account, event and organization attributes accessed from the database, as well as one or more profit factors and one or more rules, wherein the profitability calculations include:

| Profit | = | Net Interest Revenue (NIR) |
|---|---|---|
| | + | Other Revenue (OR) |
| | − | Direct Expense (DE) |
| | − | Indirect Expense (IE) |
| | − | Risk Provision (RP) |

(c) wherein the Net Interest Revenue (NIR) is calculated as:

| NIR | = | Interest Revenue |
|---|---|---|
| | − | Cost of Funds |
| | + | Value of Funds |
| | − | Interest Expense |
| | + | Earnings on Allocated Equity; |

(d) wherein the Cost of Funds includes Allocated Balances that are used to assign balance sheet amounts that are not actual account balances to the accounts for the calculated Net Interest Revenue (NIR).

12. The system of claim 11, wherein the Allocated Balances are selected from a group comprising Float, Fixed Assets, Payables and Receivables balances.

13. The system of claim 11, wherein the accounts that receive the Allocated Balances are selected based upon the account attributes.

14. The system of claim 11, wherein the Allocated Balances are apportioned among the accounts using a method selected from a group comprising:
   (1) an Account Counts method that provides allocated balance amounts based on a percentage of total accounts each account represents;
   (2) an Account Balance Amount method that provides allocated balance amounts based on a percentage of total account balance each account represents;
   (3) an Event Count method that provides allocated balance amounts based on a percentage of total events each account represents; and
   (4) an Event Balance Amount method that provides allocated balance amounts based on a percentage of total event balances each account represents.

15. The system of claim 11, further comprising logic for performing summations over the possible balance variables for the account according to the following:

| Int Inc(a) = | $\Sigma \, AB_{(asset,t)}(a) * \text{eff rate}_{(asset,t)}(a)$, |
|---|---|
| COF(a) = | $\Sigma \, AB_{(asset,t)}(a) * R_{(asset,t)}(pt(a))$, |
| Int Exp(a) = | $\Sigma \, AB_{(liability,t)}(a) * \text{eff rate}_{(liability,t)}(a)$, and |
| VOF(a) = | $\Sigma \, AB_{(liability,t)}(a) * R_{(liability,t)}(pt(a))$, | wherein:

| $AB_{(c,t)}(a)$ = | Average Balances of account a, wherein c is a balance class and t is a balance tier, |
|---|---|
| eff rate$_{(c,t)}(a)$ = | Effective interest rate for the account a, |
| pt(a) = | Product type for account a, |
| $R_{(c,t)}(pt(a))$ = | Treatment rate for accounts of the product type given the balance class and tier, |
| Int Inc(a) = | Interest Income of account a, |
| COF (a) = | Cost of Funds for account a, |
| Int Exp (a) = | Interest Expense for account a, and |
| VOF (a) = | Value of Funds fot account a. |

16. The system of claim 11, wherein an Intermediate tier calculation of the Allocated Balances allows for multiple balances on a single account, as well as the determination of treatment rate based on product type and balance type.

17. The system of claim 11, wherein an Advanced tier calculation of the Allocated Balances allows for specification of a product-level prepayment rate for the accounts.

18. The system of claim 11, wherein an Advanced tier calculation of the Allocated Balances allows loan spread, deposit spread and asset/liability spread to be separated and assigned to the accounts that generate the spreads.

19. The system of claim 11, wherein a Breakthrough tier calculation of the Allocated Balances uses a transfer price for every account based on matched maturity funding and predicted account behavior.

20. The system of claim 11, wherein a Breakthrough tier calculation of the Allocated Balances allows behavioral features, product and account features to be used to identify a transfer rate.

21. An article of manufacture embodying logic for performing financial processing in a computer, comprising:
   (a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;
   (b) performing one or more profitability calculations in the computer using the account, event and organization attributes accessed from the database, as well as one or more profit factors and one or more rules, wherein the profitability calculations include:

| Profit | = | Net Interest Revenue (NIR) |
|---|---|---|
| | + | Other Revenue (OR) |
| | − | Direct Expense (DE) |
| | − | Indirect Expense (IE) |
| | − | Risk Provision (RP) |

(c) wherein the Net Interest Revenue (NIR) is calculated as:

| | | |
|---|---|---|
| NIR | = | Interest Revenue |
| | − | Cost of Funds |
| | + | Value of Funds |
| | − | Interest Expense |
| | + | Earnings on Allocated Equity; |

(d) wherein the Cost of Funds includes Allocated Balances that are used to assign balance sheet amounts that are not actual account balances to the accounts for the calculated Net Interest Revenue (NIR).

22. The article of manufacture of claim 21, wherein the Allocated Balances are selected from a group comprising Float, Fixed Assests, Payables and Receivables balances.

23. The article of manufacture of claim 21, wherein the accounts that receive the Allocated Balances are selected based upon the account attributes.

24. The article of manufacture of claim 21, wherein the Allocated Balances are apportioned among the accounts using a method selected from a group comprising:
(1) an Account Counts method that provides allocated balance amounts based on a percentage of total accounts each account represents;
(2) an Account Balance Amount method that provides allocated balance amounts based on a percentage of total account balance each account represents;
(3) an Event Count method that provides allocated balance amounts based on a percentage of total events each account represents; and
(4) an Event Balance Amount method that provides allocated balance amounts based on a percentage of total event balances each account represents.

25. The article of manufacture of claim 21, further comprising performing summations over the possible balance variables for the account according to the following:

| | |
|---|---|
| Int Inc(a) = | $\Sigma\ AB_{(asset,t)}(a) * \text{eff rate}_{(asset,t)}(a)$, |
| COF(a) = | $\Sigma\ AB_{(asset,t)}(a) * R_{(asset,t)}(pt(a))$, |

-continued

| | |
|---|---|
| Int Exp(a) = | $\Sigma\ AB_{(liability,t)}(a) * \text{eff rate}_{(liability,t)}(a)$, and |
| VOF(a) = | $\Sigma\ AB_{(liability,t)}(a) * R_{(liability,t)}(pt(a))$, | wherein:

| | |
|---|---|
| $AB_{(c,t)}(a)$ = | Average Balances of account a, wherein c is a balance class and t is a balance tier, |
| eff rate$_{(c,t)}(a)$ = | Effective interest rate for the account a, |
| pt(a) = | Product type for account a, |
| $R_{(c,t)}(pt(a))$ = | Treatment rate for accounts of the product type given the balance class and tier, |
| Int Inc(a) = | Interest Income of account a, |
| COF (a) = | Cost of Funds for account a, |
| Int Exp (a) = | Interest Expense for account a, and |
| VOF (a) = | Value of Funds fot account a. |

26. The article of manufacture of claim 21, wherein an Intermediate tier calculation of the Allocated Balances allows for multiple balances on a single account, as well as the determination of treatment rate based on product type and balance type.

27. The article of manufacture of claim 21, wherein an Advanced tier calculation of the Allocated Balances allows for specification of a product-level prepayment rate for the accounts.

28. The article of manufacture of claim 21, wherein an Advanced tier calculation of the Allocated Balances allows loan spread, deposited spread and asset/liability spread to be separated and assigned to the accounts that generate the spreads.

29. The article of manufacture of claim 21, wherein a Breakthrough tier calculation of the Allocated Balances uses a transfer price for every account based on matched maturity funding and predicted account behavior.

30. The article of manufacture of claim 21, wherein a Breakthrough tier calculation of the Allocated Balances allows behavioral features, product and account features to be used to identify a transfer rate.

* * * * *